Patented Apr. 17, 1945

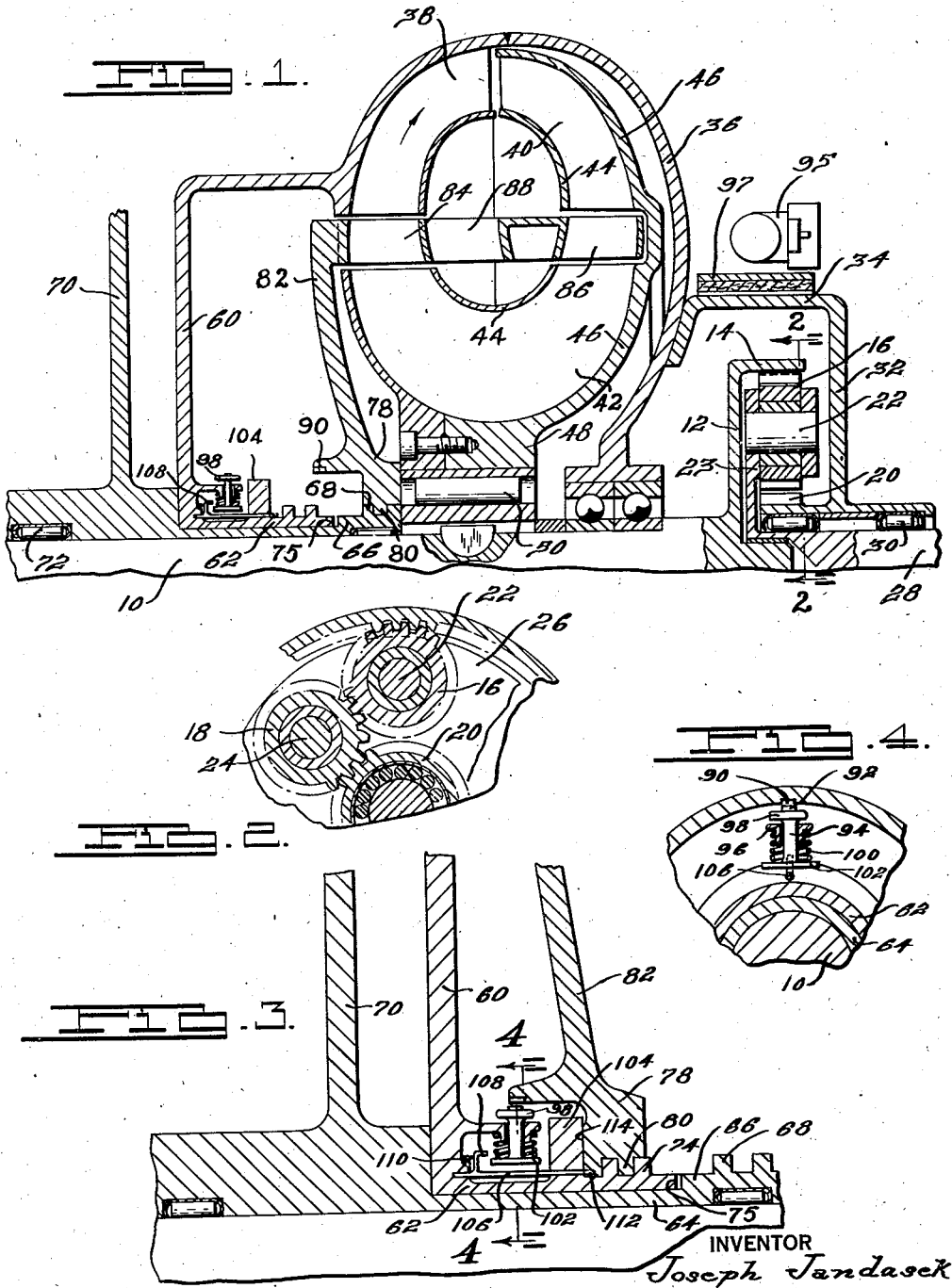

2,373,894

UNITED STATES PATENT OFFICE 2,373,894

TURBOTRANSMISSION

Joseph Jandasek, Detroit, Mich., assignor to Bendix Aviation Corporation, South Bend, Ind., a corporation of Delaware Application July 2, 1942, Serial No. 449,447

12 Claims. (Cl. 74—189.5)

This invention relates to transmissions and more particularly to a turbotransmission of the regenerative type having means for transmitting power to a driven shaft at a plurality of variable speed ratios, one of said speed ratios being fixed through planetary gearing and another ratio being infinitely variable through a fluid drive.

An object of this invention is to provide a fluid power transmitting device wherein means are provided to render the device operative as a torque converter or as a turboclutch having a multi-stage impeller.

A further object of the invention resides in the provision of planetary gearing coupling the driving and driven shafts wherein a regenerative turbotransmission may be driven by the sun gear of the planetary gearing to drive a rotatable housing including a fluid impeller at increased speed to regenerate to the driving shaft, a progressively varying proportion of power and to transmit power to the driven shaft through planet pinions interposed between the ring gear and sun gear of the planetary gearing.

A further object of the invention resides in the provision of automatically operable locking means to interconnect a retractible fluid energizing or energy absorbing member to another member as the member moves to a substantially predetermined position relative to the power transmitting fluid circuit.

Another object of the invention is to provide automatically operable locking means to lock a retractible guide wheel to a rotating shaft when the guide wheel approaches a substantially predetermined position relative to the fluid circuit.

Yet a still further object resides in the provision of a fluid deflecting member movable in a power transmitting fluid circuit between stationary and rotating positions wherein said member operates as a reaction member or as a fluid energizing or energy absorbing member and wherein automatically operable means are provided to lock said member to a rotatable member when moved to a substantially predetermined position relative to the fluid circuit.

Another object of the invention is to provide a regenerative turbotransmission associated with a mechanical gear connection between driving and driven shafts to regenerate a portion of the applied power to the driving shaft and wherein manually operable means are provided to render the regeneration of power inoperative to transmit power through the planetary gearing to the driven shaft.

Still a further object of the invention resides in the provision of locking means operable upon predetermined movement of a guide wheel member out of a power transmitting fluid circuit to lock the guide wheel member to a rotatable member to function as an auxiliary impeller or turbine member.

Another object is to provide a fluid transmission having a movable member influenced by fluid reaction and impeller speed to operate the transmission as a torque converter or as a turboclutch having a single or multiple fluid energizing member.

Other objects and advantages of this invention will be apparent from the following detailed description considered in connection with the accompanying drawing, submitted for purposes of illustration only, and not intended to define the scope of the invention, reference being had for that purpose to the subjoined claims.

In the drawing wherein similar reference characters refer to similar parts throughout the several views:

Fig. 1 is a longitudinal sectional view of a device embodying the present invention.

Fig. 2 is a fragmentary sectional view taken substantially on the line 2—2 of Fig. 1, looking in the direction of the arrows.

Fig. 3 is an enlarged view of a portion of the device illustrated in Fig. 1.

Fig. 4 is a sectional view taken substantially on the line 4—4 of Fig. 3 looking in the direction of the arrows.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation.

Referring now more particularly to Fig. 1, it will be observed that a driving shaft 10 has a radially extended flange 12 carrying a ring gear 14. The ring gear is operably connected through pinions 16 and 18 as illustrated in Fig. 2 to drive a sun gear 20. The pinions 16 and 18 are rotatably mounted on stub shafts 22 and 24 secured to a radially extended flange 23 fixed to a driven shaft 28.

The sun gear 20 is mounted for rotation on bearings 30 on the driven shaft 28 and the gear has a radially extended flange 32 terminating in a drum 34 fixed to a rotatable housing 36.

The housing 36 has therein an impeller channel 38 cooperating with first and second section turbine channels 40 and 42 respectively to form a power transmitting fluid circuit. The first and second section turbine passages 40 and 42 are provided with spaced shroud and web members 44 and 46 carried by a hub member 48 mounted for rotation on the driving shaft 10.

A one-way drive 50 is interposed between the hub 48 and the driving shaft 10 whereby energy absorbed by the turbine may be redirected back to the driving shaft to increase the effective torque to which the driving shaft is subjected.

The rotatable housing 36 also has an inwardly extended flange 60 having an axially extended hub member 62 freely rotatable on a stationary member 64. The stationary member 64 has an enlarged body portion 66 having external helical threads 68. The stationary member 64 preferably has a radially extending flange 70 and is provided with spaced bearings 72 supporting the driving shaft 10 for rotation.

The axially extended hub member 62 carried by the flange 60 of the rotatable housing 36 is provided with external helical threads 74 in alignment with the helical threads 68 of the enlarged portion 66 of the stationary member 64.

A guide wheel hub 78 having internal helical threads 80 is mounted for travel on the helical threads 68 and 74 of the stationary member 64 and the hub 62 to move axially relative to the driving shaft 10. The hub 78 has a radially extended flange 82 supporting guide wheel channels 84 and 86 shiftable in the power transmitting fluid circuit between the discharge from the turbine and the inlet to the impeller, and between the first and second stages of the turbine.

The guide wheel flange 82 has an auxiliary channel 88 adapted to be introduced into the power transmitting fluid circuit between the outlet from the second stage of the turbine 42 and the inlet to the impeller 38 when the guide wheel is in the retracted position. In this position the hub 78 of the guide wheel is mounted on the sleeve 75 carried by and rotatable with the hub member 62 of the housing 36.

Means are provided to lock the hub 78 to rotate with the housing 36 and the impeller 38 as the guide wheel approaches a substantially predetermined position in the power transmitting fluid circuit such as when the channel 88 is interposed between the outlet from the turbine and the inlet to the impeller.

One such locking means illustrated in Fig. 4 comprises locking jaws 90 and 92 between the hub 78 and members 94 radially movable in guides 96 carried by the flange 60 of the housing 36. The members 94 are provided with enlarged body portions 98 acting as centrifugal weights to move the members 94 radially to engage the jaws 90 and 92 against the resistance of the springs 100 interposed between the guides 96 and heads 102 carried by the members 94.

The impeller hub 62 has a radially extended flange 104 adjacent the outer end of the helical threads 74 serving as a stop to limit axial movement of the guide wheel.

Rods 106 axially slidable in the flanges 60 and 104 are provided with hooks 108 adapted to engage the heads 102 of the members 94 under the influence of springs 110 interposed between the hooks 108 and impeller flanges 60. The rods 106 project through the flange 104 substantially as illustrated by the dotted line 112 of Fig. 3 when the device is operating as a torque converter. When the guide wheel hub 78 moves axially on the impeller hub 62 the outer edge 114 of the guide wheel hub 78 engages the ends of the rods 106 in the dotted line position 112 and moves them axially toward the left to disengage the hooks 108 from the heads 102 of the members 94. When the hooks 108 are moved to the disengaging position with reference to the heads 102 of the members 94, the members 94 may move radially outwardly under the influence of centrifugal force exerted on the body portion 98 when the speed of rotation exerts sufficient force to overcome the resistance of the spring 100 urging the member 94 toward the driving shaft 10.

Means may be provided to render the regenerative fluid power transmitter inoperative and transmit power from the driving shaft to the driven shaft through the planetary gearing interposed therebetween.

One illustrative form of such means comprises a brake band 97 positioned to engage the drum 34 secured to the housing 36. The brake band 97 may be actuated by a fluid motor 95 controlled either mechanically or automatically under the influence of speed and/or torque conditions of the driving or driven shafts to lock the rotatable housing 36 against rotation whereupon the impeller 38 is held against rotation and the turbine members 40 and 42 automatically stop because of the lack of circulation of fluid in the power transmitting fluid circuit. The one-way driving means 50 provides for free rotation of the driving shaft 10 within the turbine hub 48. When the brake is applied the sun gear 20 is locked against rotation and accordingly power will be transmitted in a reverse direction from the ring gear 14 carried by the driving shaft 10 through the pinions 16 and 18 on the pins 22 and 24 to the flange 23 on the driven shaft 28.

When the sun gear 20 is locked against rotation the pinions 18 rotate about the stationary sun gear 20 to transmit power to the driven shaft 28 at reduced speed in a reverse direction with an increase in torque multiplication.

The operation of this transmission is as follows: Power applied to the driving shaft 10 is transmitted through the flange 12 and ring gear 14 to rotate the pinions 16 and 18. The pinions 16 and 18 are connected through the flange 23 to rotate the driven shaft 28.

Rotation of the pinions 18 is transmitted to rotate the sun gear 20 connected through the flange 32 and drum 34 to the impeller housing 36. Fluid is energized in the impeller channel 38 by rotation of the housing 36 and this energy is absorbed by the first and second section turbine channels 40 and 42 and is transmitted through the turbine hub 48 and one-way driving means 50 to be exerted back on the driving shaft 10.

When the conditions of operation of the turbo-unit are such that torque multiplication is required, the guide wheel hub 78 will be in the position illustrated in Fig. 1 wherein the guide wheel channels 84 and 86 are in the power transmitting fluid circuit at spaced points. Under these conditions of operation, power is transmitted from the impeller to the turbine with torque multiplication and the energy absorbed by the turbine is transmitted to the driving shaft 10 to exert a regenerative force thereon.

When the conditions of operation are such that torque multiplication is no longer necessary, the fluid reaction in the power transmitting fluid circuit exerted on the blades in the guide wheel channels 84 and 86 rotates the guide wheel with reference to the stationary hub 66 whereupon the guide wheel hub 78 is moved axially towards the left as viewed in Fig. 1 with reference to the impeller hub 62 to engage the smooth portion 75 of the member 62. The guide wheel member may then rotate freely on the portion 75 of the member 62 under the influence of forces exerted thereon by the guide wheel channels 84 and 86 partially positioned in the power transmitting fluid circuit, and the auxiliary impeller channel 88 also partially positioned in the power transmitting fluid circuit.

When the speed of rotation of the guide wheel approaches the speed of rotation of the impeller, the guide wheel is urged axially under the influence of forces exerted thereon in the power transmitting fluid circuit into engagement with the helical threads 74 of the impeller hub 62. As the guide wheel member continues to move axially on the helical threads the guide wheel channels 84 and 86 are shifted out of the power transmitting fluid circuit and the auxiliary impeller channel 88 is shifted into the fluid circuit, the edge 114 of the guide wheel hub 78 engages the ends of the rods 106 to move them from the dotted line position 112 into substantial alignment with the flange 104 acting as a stop to limit axial movement of the guide wheel hub 78.

Axial movement of the rods 106 disengages the hooks 108 from the heads 102 of the members 94 thereby releasing the members 94. When the speed of rotation of the impeller becomes sufficient to permit the weights 98 to overcome the force exerted by the springs 100, the members 94 move radially outwardly to engage the jaws 90 and 92 whereupon the guide wheel is effectively clutched to the impeller. The auxiliary channel 88 is then interposed in the power transmitting fluid circuit and operates as an auxiliary impeller to impart energy from the driving shaft 10 to the circulating fluid.

When an increase in the load transmitted is encountered, the prime mover or driving shaft 10 will decelerate whereupon the centrifugal force exerted on the weight 98 decreases. When a sufficient decrease in the centrifugal force is attained, the springs 100 move the member 94 to disengage the jaws 90 and 92 and releasing the hub 78 for movement on the hubs 62 and 66 in accordance with loads to which the auxiliary impeller member 88 is subjected in the power transmitting fluid circuit. The force exerted by the springs 100, the weights 98 and the members 94 may be calibrated to permit the jaws 92 to release the jaws 90 when the jaws are unloaded or subjected to little load whereupon the frictional resistance to the disengaging movement is minimized.

When the torque multiplication is required, the guide wheel rotates backwardly on the impeller hub 62 whereupon the guide wheel will be shifted to the right as viewed in Figs. 1 and 3 by the helical threads to position the guide wheel channels 84 and 86 in the power transmitting fluid circuit. As the hub 78 moves away from the flange 104, the springs 110 yieldingly urge the rods 106 to move whereupon the hooks 108 engage the heads 102 and the ends of the rods 106 project through the flange 104 as illustrated in the dotted line position 112 to lock the members 94 from operating under the influence of centrifugal force. The guide wheel hub 78 moves axially on the helical threads under the influence of the force exerted by fluid reaction in the power transmitting fluid circuit to the position illustrated in Fig. 1 whereupon the guide wheel channels 84 and 86 are aligned with the power transmitting fluid circuit and power may be transmitted with torque multiplication.

I claim:

1. A transmission comprising driving and driven shafts, planetary gearing interposed between the driving and driven shafts, regenerative fluid power transmitting means interposed between the planetary gearing and driving shaft, said fluid power transmitting means comprising impeller and turbine members cooperating to form a power transmitting fluid circuit, a stationary member concentrically mounted on the driving shaft, a guide wheel member having main and auxiliary channels movable axially relative to the stationary member between an operative position wherein the guide wheel is aligned with the power transmitting fluid circuit and an inoperative position wherein the auxiliary channel is aligned with the power transmitting fluid circuit, connecting means between the guide wheel member and the impeller member operative upon axial movement of the guide wheel member relative to the stationary member to said guide wheel inoperative position to clutch the guide wheel member to the impeller member under the influence of centrifugal force to operate the auxiliary channel as an auxiliary impeller.

2. In a regenerative fluid operated transmission, a driving shaft, an impeller operably connected to the driving shaft, a turbine aligned with the impeller and cooperating therewith to form a power transmitting fluid circuit, one-way driving means between the turbine and driving shaft, guide wheel means having spaced fluid deflecting channels adapted to be selectively introduced into the power transmitting fluid circuit to selectively operate the transmission as a torque converter or as a turboclutch, means to lock the guide wheel member against rotation in one direction when the transmission is operating as a torque converter, the spaced fluid deflecting channels being responsive to fluid reaction in the power transmitting fluid circuit to rotate the guide wheel backwardly relative to the direction of rotation of the impeller and turbine members to operate the transmission as a fluid clutch, means responsive to backward rotation of the guide wheel member to shift it axially relative to the fluid circuit, and means responsive to predetermined shifting of the guide wheel relative to the fluid circuit and to predetermined speed of rotation of the impeller to clutch the guide wheel to the impeller to operate the guide wheel as an auxiliary impeller.

3. A transmission comprising driving and driven shafts, planetary gearing interposed between the driving shaft and the planetary gearing, a pinion carrier between the pinion gears and the driven shaft, a sun gear driven by the planetary gearing, a regenerative fluid operated transmission comprising an impeller driven by the sun gear, a turbine aligned with the impeller and cooperating therewith to form a power transmitting fluid circuit, one-way driving means between the turbine and driving shaft, guide wheel means having spaced fluid deflecting channels adapted to be selectively introduced into the power transmitting fluid circuit to selectively operate the device as a torque converter or as a turboclutch, and means responsive to fluid reaction in the power transmitting fluid circuit and the speed of rotation of the impeller while the device is operating as a turboclutch to lock the guide wheel member to the impeller to function as an auxiliary impeller member.

4. A transmission comprising driving and driven shafts, planetary gearing between the driving and driven shafts, a fluid operated transmission comprising aligned impeller and turbine members cooperating to form a power transmitting fluid circuit, connecting means between the impeller and said planetary gearing, a stationary member, a guide wheel member having a plurality of sets of spaced fluid deflecting blades adapted to be selectively introduced into the fluid circuit and operative in one position to induce the fluid operated transmission to function as a torque converter and operative in another position to induce said transmission to operate as a turboclutch, an impeller hub concentrically mounted on the stationary member, cooperating helical threads on the stationary and impeller members, a hub for the guide wheel member, helical threads on the guide wheel hub cooperating with the helical threads on the stationary and impeller members to shift the guide wheel member relative to the power transmitting fluid circuit, centrifugally actuated locking means operative upon predetermined axial movement of the guide wheel member relative to the impeller member and predetermined speed of rotation of the impeller member to lock the guide wheel member to the impeller member to operate the guide wheel member as an auxiliary impeller, stop means operative upon predetermined axial movement of the guide wheel hub relative to the impeller member to render inoperative the locking means, and brake means interposed between the impeller and planetary gearing to render inoperative the fluid operated transmission to transmit power from the driving shaft to the driven shaft at a different speed and direction.

5. A fluid operated transmission comprising fluid energizing and energy absorbing blade wheels cooperating to form a power transmitting fluid circuit, a guide wheel having a plurality of sets of spaced fluid deflecting blades to operate the transmission as a torque converter or as a fluid clutch, means to move the guide wheel relative to the fluid circuit to selectively introduce said sets of spaced fluid deflecting blades into the power transmitting fluid circuit, means to lock the guide wheel member against rotation when the transmission is operating as a torque converter, and centrifugally actuated means operable in response to variations of fluid reaction in the power transmitting fluid circuit and impeller speed to lock the guide wheel member to rotate with the impeller member when the transmission is operating as a fluid clutch with one of said sets of fluid deflecting blades in the fluid circuit to operate said blades as an auxiliary impeller.

6. A turbotransmission comprising impeller and turbine members cooperating to form a power transmitting fluid circuit, a guide wheel member having spaced bladed channel portions movable relative to the power transmitting fluid circuit to selectively operate the transmission as a torque converter or as a turboclutch, means responsive to fluid reaction in the fluid circuit to move the guide wheel member relative to the power transmitting fluid circuit, means to lock the guide wheel against rotation when the transmission is operating as a torque converter, centrifugally operated means responsive to the speed of rotation of the impeller while the transmission is operating as a turboclutch to lock the guide wheel member to the impeller member to operate the guide wheel member as an auxiliary impeller member, and stop means operative while the transmission is operating as a torque converter to render inoperative the centrifugally operated means.

7. A transmission comprising driving and driven shafts, aligned impeller and turbine members cooperating to form a power transmitting fluid circuit, a stationary member, an axially shiftable guide wheel member having a plurality of sets of axially spaced fluid deflecting blades adapted to be selectively introduced into the fluid circuit, an impeller hub concentrically mounted on the stationary member, helical threads on the stationary and impeller members, a hub for the guide wheel member, helical threads on the guide wheel hub cooperating with the helical threads on the stationary and impeller members to shift the guide wheel member relative to the power transmitting fluid circuit to operate the transmission as a torque converter when the hub is on the helical threads of the stationary member and as a turboclutch when the hub is on the helical threads of the impeller member, centrifugally actuated locking means operative upon predetermined axial movement of the guide wheel member towards the impeller hub member and predetermined speed of rotation of the impeller member to lock the guide wheel member to the impeller member to operate the guide wheel member as an auxiliary impeller, and stop means operative upon predetermined axial movement of the guide wheel hub towards the helical threads on the stationary member to render inoperative the locking means.

8. In a fluid operated transmission, driving and driven members, impeller and turbine members operably connected to the driving and driven members and cooperating to form a power transmitting fluid circuit, an axially extending stationary member, a guide wheel member having spaced bladed channels movable axially relative to the stationary member between spaced positions to operate the transmission as a torque converter or as a fluid clutch, means to lock the guide wheel member against rotation when the transmission is operating as a torque converter, locking means operative upon predetermined axial movement of the guide wheel member and predetermined rotative speed of the impeller member to lock the guide wheel member to the impeller, and an auxiliary impeller channel carried by the guide wheel member and operative when the transmission is functioning as a fluid clutch to energize fluid in the power transmitting fluid circuit.

9. A fluid operated transmission comprising fluid energizing and energy absorbing blade wheels cooperating to form a power transmitting fluid circuit, a guide wheel having a plurality of spaced independently operable fluid deflecting blades to operate the transmission as a torque converter or as a fluid clutch, means to move the guide wheel relative to the fluid circuit to selectively introduce said sets of spaced fluid deflecting blades into the power transmitting fluid circuit, means to lock the guide wheel against reverse rotation when the transmission is operating as a torque converter, and means operable in response to variations of fluid reaction in the power transmitting fluid circuit and impeller speed to lock the guide wheel member to rotate with the impeller member when the transmission is functioning as a fluid clutch with one of said sets of fluid deflecting blades in the fluid circuit to operate said blades as an auxiliary impeller.

10. A fluid operated transmission comprising fluid energizing and energy absorbing blade wheels cooperating to form a power transmitting fluid circuit, a stationary member, a guide wheel having spaced sets of main and auxiliary fluid deflecting blades adapted to be selectively introduced into the power transmitting fluid circuit to selectively operate the transmission as a torque converter or as a fluid clutch, means to lock the guide wheel against rotation when the transmission is operating as a torque converter, means operable in response to variations of fluid reaction in the power transmitting fluid circuit and impeller speed to lock the guide wheel member to rotate with the impeller member when the transmission is operating as a fluid clutch and the auxiliary fluid deflecting blades are in the fluid circuit to induce said blades to function as an auxiliary impeller, said last named means comprising centrifugally actuated means controlling the locking means, and stop means to render the locking means inoperative when the main fluid deflecting blades are in the power transmitting fluid circuit to operate the transmission as a torque converter.

11. A fluid operated transmission comprising impeller and turbine members cooperating to form a power transmitting fluid circuit, a guide wheel member having spaced fluid deflecting channels adapted to be separately introduced into the power transmitting fluid circuit to selectively operate the transmission as a torque converter or as a fluid clutch, means to lock the guide wheel member against rotation in one direction when the transmission is operating as a torque converter, means responsive to fluid reaction in the fluid circuit to move the guide wheel member relative to the power transmitting fluid circuit, and centrifugally operated means responsive to the speed of rotation of the impeller while the transmission is operating as a fluid clutch to lock the guide wheel member to the impeller member to operate as an auxiliary impeller.

12. A transmission comprising driving and driven shafts, planetary gearing including multiple cluster pinion gears interposed between the driving and driven shafts, a ring gear between the driving shaft and the planetary gearing, a pinion carrier between the pinion gears and the driven shaft, a sun gear driven by the planetary gearing, a regenerative fluid operated transmission interposed between the sun gear and the driving shaft and having impeller and turbine members cooperating to form a power transmitting fluid circuit, a guide wheel member having spaced fluid deflecting vanes adapted to be introduced into the fluid circuit to operate the fluid operated transmission as a torque converter or as a fluid clutch, and means responsive to fluid reaction in the power transmitting fluid circuit and the speed of the impeller while the device is operating as a fluid clutch to lock the guide wheel member to the impeller to function as an auxiliary impeller member.

JOSEPH JANDASEK.